2 Sheets—Sheet 1.

O. W. KENISON.
Shedding Mechanism for Looms.

No. 213,208.      Patented Mar. 11, 1879.

Witnesses.
N. E. Whitney.
L. F. Connor.

Inventor.
Orrin W. Kenison
by Crosby & Gregory, Attys

2 Sheets—Sheet 2.

O. W. KENISON.
Shedding Mechanism for Looms.

No. 213,208.   Patented Mar. 11, 1879.

Witnesses.
N. E. Whitney.
L. F. Connor.

Inventor
Orrin W. Kenison
by Crosby & Gregory
Atty

N. PETERS, PHOTO-LITHOGRAPHER, WASHINGTON, D. C.

UNITED STATES PATENT OFFICE.

ORRIN W. KENISON, OF LAWRENCE, MASSACHUSETTS.

IMPROVEMENT IN SHEDDING MECHANISMS FOR LOOMS.

Specification forming part of Letters Patent No. 213,208, dated March 11, 1879; application filed October 25, 1878.

*To all whom it may concern:*

Be it known that I, ORRIN W. KENISON, of Lawrence, county of Essex, State of Massachusetts, have invented an Improvement in Shedding Mechanism for Looms, of which the following description, in connection with the accompanying drawings, forming a part thereof, is a specification.

This invention relates to looms, and has reference specially to mechanism for forming the shed or division in the warps for the passage of the shuttle.

In this invention I employ jack-carriers provided with shoulders, upon which are pivoted notched jacks, which are acted upon and moved in one direction by the agency of a pattern-surface, so as to be engaged by a lifter, and which are also acted upon by a spring which throws them in the opposite direction, the jacks not moved by the pattern-cylinder being thereby placed so that certain notched portions thereof are thrown upon a rest-bar, where they are held until selected by the pattern.

The jack-carriers and jacks are lifted after each shed by an evener, thereby permitting each of the said springs to throw its jack upon the rest-bar.

Figure 1:
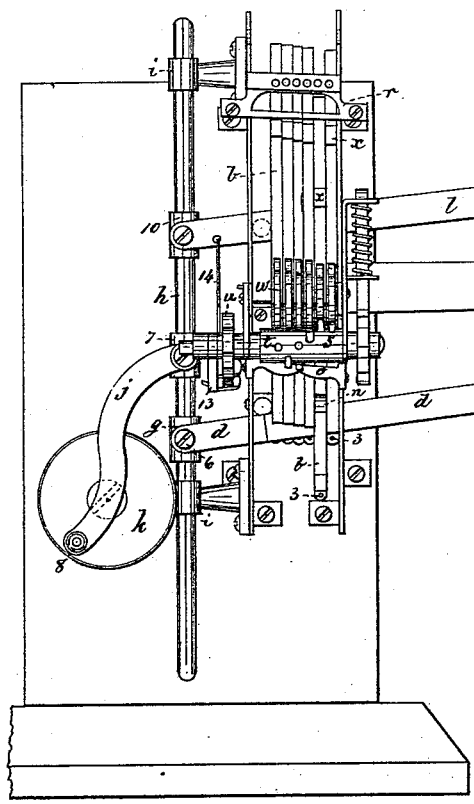
Figures 2, 3:
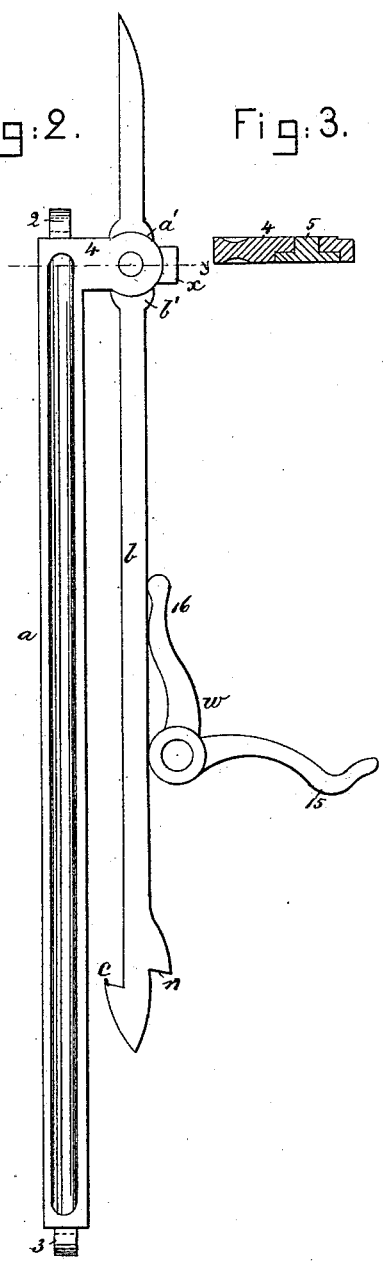
Figure 4:
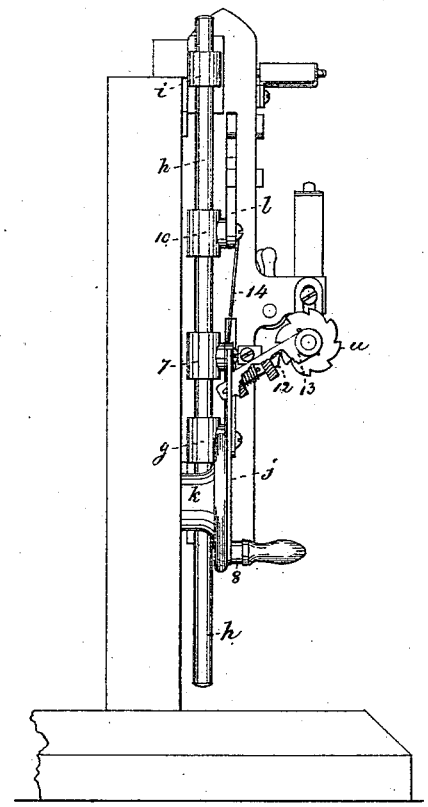
Figure 5:
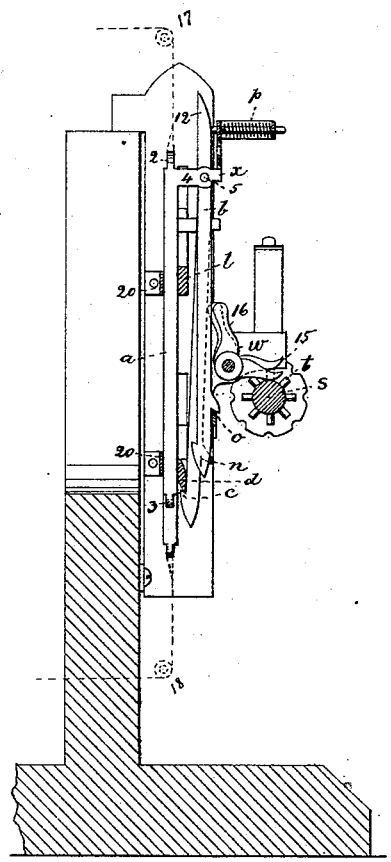

Figure 1 represents, in front view, sufficient of my improved shed-forming mechanism to enable one conversant with looms to understand it. Fig. 2 is an enlarged side elevation of one of the jacks and its carrier; Fig. 3, a cross-section of Fig. 2 on the dotted line $y\ y$, Fig. 2; Fig. 4, a side elevation of Fig. 1; and Fig. 5, a vertical section of Fig. 1, taken between adjacent jacks and carriers.

In the drawings I have considered it unnecessary to show the harness and loom frames, as they may be of any usual construction.

The usual harness-frames will be connected by suitable cording with the jack-carriers $a$, the cording being extended over suitable sheaves or pulleys, and being tied or fastened to the upper and lower ends of the carriers at 2 3, where are made suitable holes for that purpose.

Each jack-carrier has an ear, 4, provided with a hole to receive a pin, 5, forming, preferably, a part of the jack $b$, shoulders $a'\ b'$ of the jack embracing the ear 4, which is rounded at bottom and top, as seen in Fig. 2.

The pivoted jack at its lower end has a hook, $c$, to be acted upon by the lifter $d$, supported at one end, as shown in this instance of my invention, by a link, $e$, attached to the rigid arm $f$, the opposite end of the lifter being connected at 6 with a collar, $g$, on the slide-rod $h$, held in guides $i$, and reciprocated by a link, $j$, connected with the collar 7 and with a crank-pin, 8, of the wheel or crank $k$. The ears 4 at each elevation of the slide-rod are acted upon by the evener $l$, connected at one end with the collar 10 upon the slide-rod $h$ and at its other end with the link $m$. This evener raises all the jack-carriers and jacks, so that the notched portions $n$ pass over and catch upon the rest-bar $o$, (see Fig. 5,) a spring-held jack tipping rod or device, $p$, at the upper end of each jack-extension 12 throwing the jack about its pivot so as to engage with the rest-bar.

The extreme outer end, $x$, of the ear 4 of each jack-carrier when elevated by the evener meets an inclined stop-bar, $r$, which determines the lowermost position of the harness-frames, and stops the jacks with their notched portions $n$ in proper position to pass over and upon the rest-bar.

The pattern surface or cylinder $s$, provided, as shown, with pins $t$ and a ratchet, $u$, is rotated by means of a pawl, 12, on an arm, 13, vibrated, as shown, by the evener, with which the arm is connected by a link, 14. (See Fig. 4.) The jacks $b$ are thrown from the rest-bar at the proper times, according to the exigencies of the pattern-cylinder, by means of the pins $t$, which act upon the arms 15 of the pivoted fingers $w$, their arms 16 acting directly upon the jacks in opposition to the springs $p$, and all the jacks so thrown off from the rest-bar $o$ are caught by the lifter $d$, and the harness-frames connected with them and their warps are lifted for the passage of the shuttle.

The pattern-cylinder is provided with any usual device to prevent its rotation beyond the point to which it is moved by the direct action of the pawl 12.

In the drawings I have shown in dotted lines two sheaves, 17 18, and cords extended over them, and from such sheaves the cords will extend over other sheaves, as in the Crompton or Knowles looms, to the upper and lower sides of the harness-frames.

In other fancy looms wherein notched jacks are used, it is customary to employ a lifter and depressor, each of which engages notches made in the jacks. The lifters and depressors are moved in opposite directions at the same time, are actuated by separate slide-rods, and one and usually two eveners are employed.

In this my invention I employ but one lifter and evener, and both are moved simultaneously in the same direction by the same slide-rod, thereby producing a very simple, cheap, and effective shed-forming mechanism.

The jack-carriers have their support upon bars 20.

It is obvious that the pin 5, shown as formed upon the jack, may be made upon the carrier, and a hole be made in the jack.

If desired the jack-carriers may be connected with horizontal levers at the bottom and top of the loom-frame, the levers being attached to the harness-frames, as shown in United States Patent No. 94,401.

I claim—

1. In a loom, a reciprocating jack-carrier provided with an ear and a notched jack pivoted thereon, combined with a lifter and an evener, mechanism to operate and move them in unison in the same direction, a jack-tripping device, and a rest-bar to co-operate with the notches $n$ of the jacks and support them out of the range of the lifter, substantially as described.

2. The reciprocating jack-carriers provided with ears 4 and the jacks pivoted thereto, notched at $c$ $n$, and extended, as at 12, combined with a rest-bar, a pattern-cylinder, intermediate devices to act upon the jacks to remove them from the rest-bar, and springs to throw the jacks upon the rest-bar when the carriers are raised, substantially as described.

In testimony whereof I have signed my name to this specification in the presence of two subscribing witnesses.

ORRIN W. KENISON.

Witnesses:
G. W. GREGORY,
L. F. CONNOR.